W. G. JOHNSON.
TRACTION ATTACHMENT FOR VEHICLE WHEELS.
APPLICATION FILED OCT. 27, 1921.
1,437,106.  Patented Nov. 28, 1922.
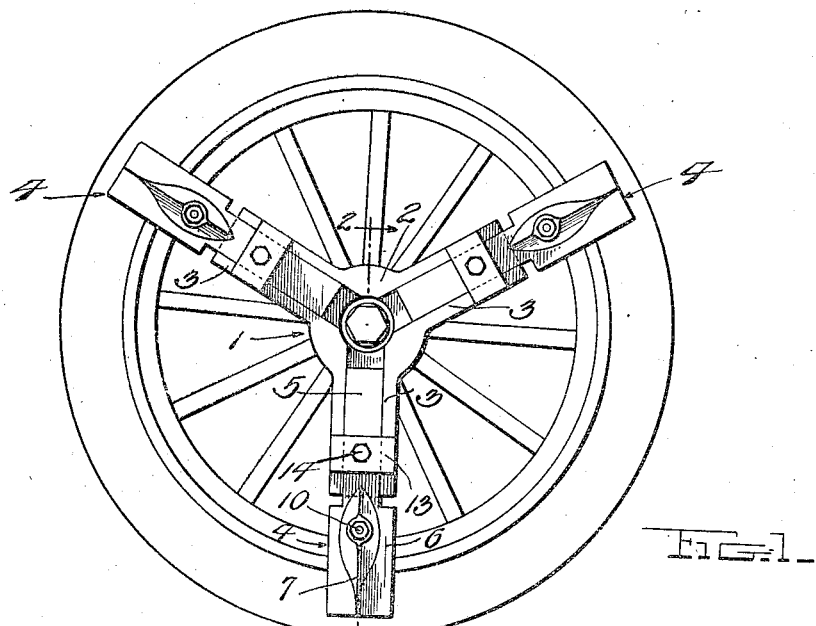
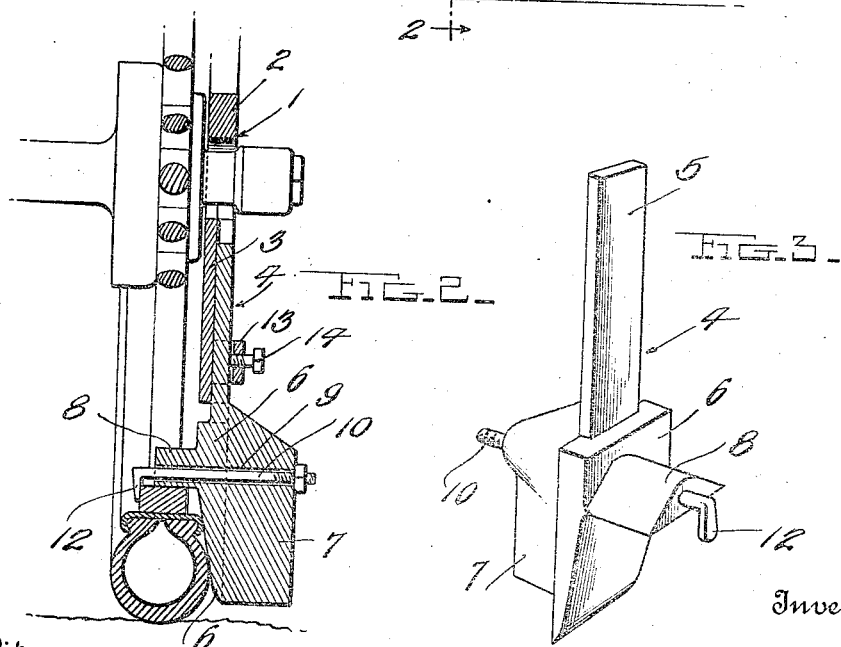
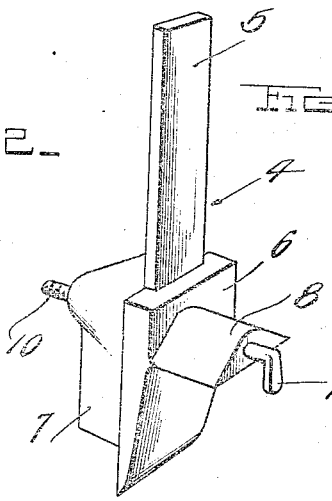
Witness
J. R. Pierce
Inventor
W. G. Johnson
By H. B. Willson & Co.
Attorneys Patented Nov. 28, 1922.

1,437,106

UNITED STATES PATENT OFFICE.

WILLIAM G. JOHNSON, OF GUTHRIE, OKLAHOMA.

TRACTION ATTACHMENT FOR VEHICLE WHEELS.

Application filed October 27, 1921. Serial No. 510,833.

*To all whom it may concern:*

Be it known that I, WILLIAM G. JOHNSON, a citizen of the United States, residing at Guthrie, in the county of Logan and State of Oklahoma, have invented certain new and useful Improvements in Traction Attachments for Vehicle Wheels; and I do declare the following to be a full, clear, and exact description of the invention, such as will enable others skilled in the art to which it appertains to make and use the same.

This invention relates to an improved traction device for attachment to vehicle wheels, and it has for its principal object to generally improve upon attachments of this class by providing one of extreme simplicity and durability which is easily and readily applicable to the wheel and which is such in construction that effectivenesss of operation is insured and, owing to its extreme simplicity, is comparatively inexpensive to manufacture.

Another object of the invention is to provide an attachment of this class which embodies a spider designed for disposition against the outer side of the wheel, together with adjustable traction members associated therewith, these traction members each embodying a pair of ground-engaging calks which are disposed at right angles to one another so that when in use, one of them serves to prevent side-wise movement of the vehicle, while the other one serves to prevent rearward or forward slipping and insures proper traction for pulling through mud.

Other objects and advantages of the invention will be apparent during the course of the following description.

In the accompanying drawings forming a part of this specification and in which like numerals are employed to designate like parts throughout the same:

Figure 1 is a side elevational view of a vehicle wheel equipped with a traction attachment constructed in accordance with this invention.

Figure 2 is an enlarged detail sectional view taken substantially on the plane of the line 2—2 of Fig. 1.

Figure 3 is a detail perspective view of one of the traction devices.

The improved attachment in its preferred form embodies a spider 1 which is adapted to be positioned against the outer side of the vehicle wheel, said spider including a ring-like center 2 which surrounds the hub cap, and a plurality of radial arms 3 of channel formation. Co-operative with this spider are a plurality of traction devices which are generally indicated by the numerals 4. In Fig. 3 I have shown an enlarged perspective view of one of such devices and by directing attention to this figure it will be seen that each of such devices includes an extension 5 which is slidably received in one of the channel shaped arms 3 to permit the attachment to be adjusted to accommodate different diameters of wheels. At its outer end, this extension is formed with a head, which among other details, includes a pair of beveled ground-engaging calks 6 and 7 respectively. It is to be noted that these calks are an integral part of the device under consideration and are disposed at right angles with respect to one another. It therefore follows that when in position for use, the calks 6 serve to eliminate as much as possible, side-wise movement of the vehicle, whereas the remaining calks serve to obtain the desired traction and prevent excessive forward or rear slipping of the vehicle. By beveling the calks in the manner shown, the lower edges thereof are rendered sufficiently thin to insure effective results. The head in addition to including said calks also embodies a laterally disposed lug 8 which is designed to engage the inner periphery of the wheel felly as clearly shown in Fig. 2. It is also to be noted that the head is provided with a horizontally disposed bore 9 which extends entirely therethrough and which serves to permit a retaining bolt 10 to be passed therethrough for engagement with the wheel. In the particular construction of this retaining means, it will be seen that the free end of the bolt is directed laterally as indicated at 12 to permit it to be engaged with the wheel felly for holding the attachment in place on the wheel and permitting it to be quickly removed or applied. It is yet to be mentioned that each of the aforesaid channel arms 3 are formed with transverse straps 13 which serve to permit set screws 14 to be passed therethrough for engagement with the slidable extensions 5 to retain the latter in set positions after being adjusted.

In use, the device is placed against the outer side of the wheel with the center 2 of the spider surrounding the hub cap of the wheel and the laterally turned ends of the retaining bolt 10 are engaged with the inner side of the wheel felly so as to hold the attachment in place on the wheel. Of course, before the bolt can be effectively engaged with the wheel felly, it is necessary to properly adjust the traction devices 4 by loosening the set screws 14. After the device is in position on the wheel as shown clearly in the drawing, it will be seen that when the vehicle is passing through mud, the calkes will prevent side-wise movement, forward and rearward slipping and will insure proper traction to enable the vehicle to travel with ease. It may be noted that the calks 6 in addition to eliminating side-wise movement of the vehicle, bear against the tire and tend to prevent loose movement of the traction devices themselves.

From the foregoing description, it will be seen that I have devised a novel traction device which may be easily and readily attached to or removed from conventional types of vehicle wheels. The device not only enables the proper traction to be obtained, but it prevents slipping of the vehicle in all directions and it will be comparatively easy for the vehicle to pull through deep mud. These and other features and advantages of the invention have no doubt been made apparent from the foregoing description and drawings. Also, the manner of applying and removing the attachment has been made clear. In view of this, a more lengthy and detailed description is thought unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A traction attachment for vehicle wheels comprising a spider for disposition against the outer side of the wheel, and a plurality of traction members associated therewith, said traction members each embodying extensions adjustably engaged with one of the arms of the spider, and each extension having anti-slipping calks at its outer end, said calks being disposed at right angles with respect to each other so that one of them serves to eliminate side slipping of the vehicle, while the other eliminates longitudinal slipping and insures the proper traction.

2. A traction attachment for vehicle wheels comprising a spider adapted to be positioned against one side of the wheel; a traction member carried by each arm of said spider, each traction member being formed at its outer end with a head including anti-slipping means, a horizontal bore extending therethrough, and a laterally disposed lug adapted to bear against the inner periphery of the wheel felly, and a bolt passing through said bore, the inner end of said bolt being bent laterally for engagement with the inner side of said wheel felly to retain the attachment in place on the wheel.

3. A traction attachment for vehicle wheels comprising a spider including a ring-like center adapted to surround the hub-cap of a vehicle wheel, and also including a plurality of radially extending channel-shaped arms; a plurality of traction devices, each traction device including an extension slidably engaged with one of the aforesaid channel-shaped arms, said extension being formed at its outer end with a pair of ground-engaging calks, said calks being arranged at right angles with respect to one another and one of them carrying a laterally disposed lug designed to engage the inner periphery of the wheel felly, said lugs and calks being formed with a bore; a bolt passing through said bore and having its inner end bent laterally for engagement with the wheel felly, and set-screws carried by the aforesaid channel arms and engaging said extensions for retaining the latter in set positions.

4. In a wheel traction attachment of the class described, a traction device including an extension to be slidably mounted on the wheel, said extension being formed at its outer end with a pair of ground-engaging calks, said calks being arranged at right angles with respect to one another and one of them carrying a laterally disposed lug designed to engage the inner periphery of the wheel felly, and there being a bore formed through the lug and calks to permit passage of a retaining bolt.

In testimony whereof I have hereunto set my hand.

WILLIAM G. JOHNSON.